United States Patent
Bakker

(10) Patent No.: US 10,616,935 B2
(45) Date of Patent: Apr. 7, 2020

(54) EMERGENCY CALLS

(71) Applicant: BlackBerry Limited, Waterloo, Ontario (CA)

(72) Inventor: Jan Hendrik Lucas Bakker, Fort Worth, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 16/398,818

(22) Filed: Apr. 30, 2019

(65) Prior Publication Data

US 2019/0394814 A1    Dec. 26, 2019

Related U.S. Application Data

(60) Provisional application No. 62/688,838, filed on Jun. 22, 2018.

(51) Int. Cl.
*H04W 64/00* (2009.01)
*H04W 76/11* (2018.01)
*H04W 4/90* (2018.01)
*H04W 84/04* (2009.01)

(52) U.S. Cl.
CPC ............. *H04W 76/11* (2018.02); *H04W 4/90* (2018.02); *H04W 84/042* (2013.01)

(58) Field of Classification Search
None
See application file for complete search history.

(56) References Cited

U.S. PATENT DOCUMENTS

2009/0296689 A1* 12/2009 Bakker ............ H04W 4/90
370/352
2013/0090082 A1    4/2013 Lim et al.

FOREIGN PATENT DOCUMENTS

WO    2017/174014 A1    10/2017

OTHER PUBLICATIONS

3GPP TS 24.229 V15.2.0 Technical Specification 3rd Generation Partnership Project; Technical Specification Group Core Network and Terminals; IP multimedia call control protocol based on Session Initiation Protocol (SIP) and Session Description Protocol (SDP); Stage 3 (Release 15) (Mar. 2018) (69 pages).
ISA/US, International Search Report and Written Opinion for PCT/US19/38399 dated Sep. 17, 2019 (10 pages).

* cited by examiner

*Primary Examiner* — Suhail Khan
(74) *Attorney, Agent, or Firm* — Trop, Pruner & Hu, P.C.

(57) ABSTRACT

In some examples, a device detects a calling identifier received as part of initiating a call matches an emergency identifier, the emergency identifier associated with information from which to derive a Uniform Resource Name (URN). The device detects that the device is in a first network different from a second network, where the second network configured the emergency identifier. In response to detecting that the device is in the first network different from the second network, the device includes a URN, urn:service:sos, in a Session Initiation Protocol (SIP) INVITE message to be transmitted.

20 Claims, 8 Drawing Sheets

EMERGENCY CALLS

CROSS REFERENCE TO RELATED APPLICATION

This application claims the benefit under 35 U.S.C. § 119(e) of U.S. Provisional Application Ser. No. 62/688,838, filed Jun. 22, 2018, which is hereby incorporated by reference.

BACKGROUND

Telecommunication services are offered via networks, such as Public Land Mobile Networks (PLMNs). In some examples, a network can include an access network, a core network, and an Internet Protocol (IP) Multimedia Subsystem (IMS). Other networks can include other components. Services can be provided by a user's home network. When the user is using a non-home network or visited network, that network may have a relation with the user's home network. Some information transmitted by the user's user equipment (UE) is communicated back to the home network via the visited network.

The communication of information from the UE to the home network via the visited network may take different routes, travel through different network elements based on, for example, the type of relation between the home and the visited network, or based on the technology of the networks. For example, a fifth generation (5G) core network has different network elements compared to an Evolved Packet Core (EPC) network. EPC is a framework that provides converged voice and data in a fourth generation (4G) wireless network, such as a Long Term Evolution (LTE) network.

The IMS contains, for example, a P-CSCF. The EPC contains, for example, a Mobility Management Entity (MME). The 5G CN contains, for example, an access and mobility management function (AMF).

Networks may offer a Circuit Switched (CS) domain, where traditionally voice calls and emergency calls are handled, or a Packet Switched (PS) domain, offering PS services including access to the IMS are handled.

The PS domain supports emergency services via the IMS. A UE may support accessing one or both of the CS domain and PS domain. A UE supporting PS domain may also support IMS.

BRIEF DESCRIPTION OF THE DRAWINGS

Some implementations of the present disclosure are described with respect to the following figures.

Figure 1:
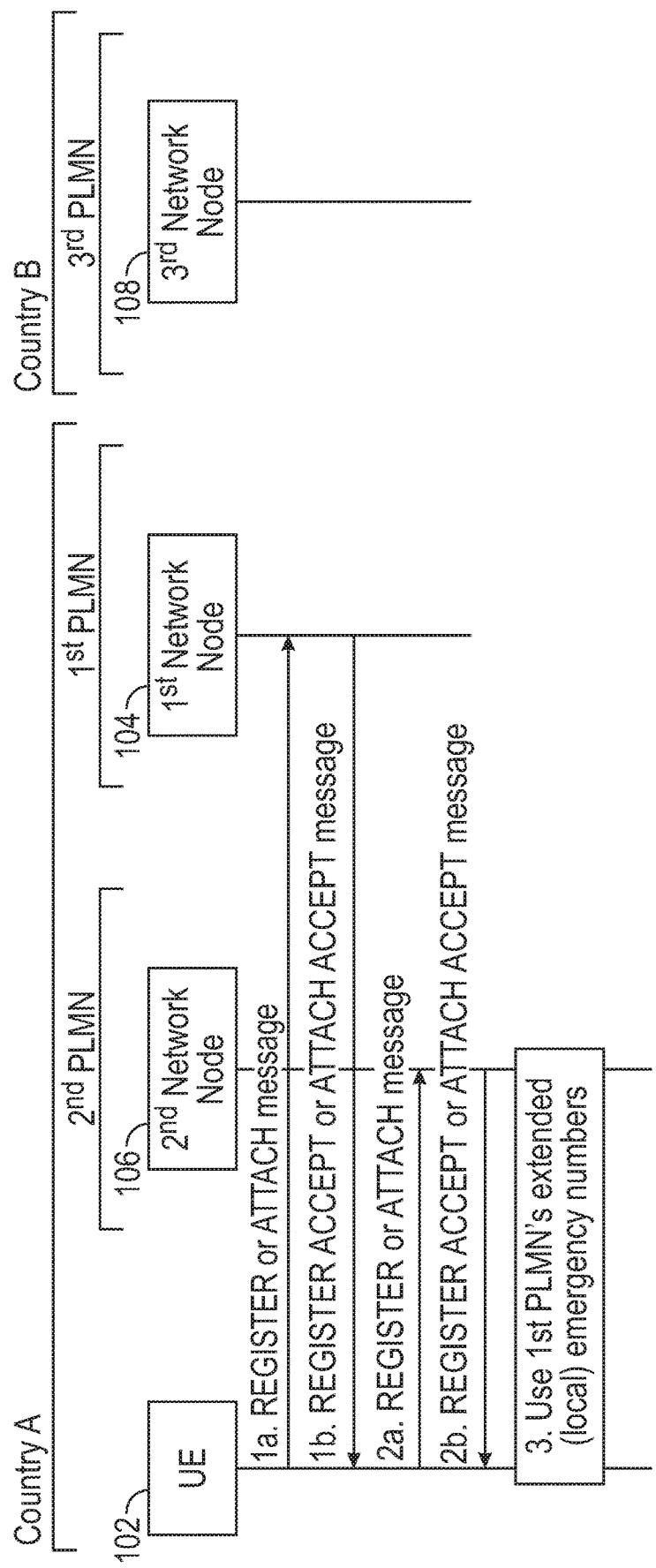
FIGS. 1-3 illustrate three different scenarios of messaging between a UE and network nodes, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

1. General

1.1 Acronyms & Abbreviations

Table 1 below lists various acronyms and abbreviations.

TABLE 1

| Acronym/Abbreviation | Full text | Brief Description |
|---|---|---|
| 5G AN | 5G Access Network | An access network comprising a next generation radio access network (NG-RAN) and/or a non-Third Generation Partnership Project Access Network (non-3GPP AN) connecting to a 5G Core Network. |
| 5G CN | 5G Core Network: | A core network that connects to a 5G Access Network. This core network is part of a 5GS. |
| 5GS | 5G System | 3GPP system including 5G Access Network (AN), 5G Core Network and UE. |
| IMS | IP Multimedia Subsystem | Includes network elements supporting the Session Initiation Protocol (SIP), such as a P-CSCF. |
| P-CSCF | Proxy-CSCF | |
| CSCF | Call Session Control Function | |
| PLMN | Public Land Mobile Network | |
| IP | Internet Protocol | |
| CN | Core Network | A core network specified in the present document. It connects to an AN. This core network can be part of a 3GPP system. Examples of a CN are 5G CN, EPC network and GPRS core network. Examples of an AN are Wireless Local Area Network (WLAN), NG-RAN, E-UTRAN, UTRAN and GERAN. |
| 3GPP system | | Examples are GPRS system, Evolved Packet System (EPS) and 5GS. |
| AN | Access Network | |
| CS | Circuit switched | |
| PS | Packet switched | |

TABLE 1-continued

| Acronym/Abbreviation | Full text | Brief Description |
|---|---|---|
| AMF | Access and Mobility Management Function | An AMF performs at least some of the functions in a 5G CN that a MME performs in the EPC. |
| UE | User Equipment | |
| NR | New Radio | New radio access network, supported by 5G CN. |
| E-UTRA | Evolved Universal Terrestrial Radio Access (UTRA) | Radio access, supported by 5G CN or EPC. |
| NG-RAN | Next Generaton- Radio Acces Network | A radio access network that supports one or more of the following options with the common characteristics that it connects to 5GC:<br>1) Standalone New Radio.<br>2) New Radio is the anchor with E-UTRA extensions.<br>3) Standalone E-UTRA.<br>4) E-UTRA is the anchor with New Radio extensions. |
| URN | Uniform Resource Name | |
| PSAP | Public Safety Answering Point | |
| RAT | Radio Access Technology | |
| UPF | User Plane Function | An UPF performs at least some of the functions in a 5G CN that a PDN GW performs in the EPC. |
| 3GPP | 3rd Generation Partnership Project | |
| IE | information element | |
| IEI | IE identifier | |
| PDN GW | Packet Data Network Gateway | |
| IP-CAN | IP-Connectivity Access Network | |
| EMM | EPS Mobility Management | |

1.2 Terminology

Table 2 below summarizes various terms used.

TABLE 2

| Term | Brief Description |
|---|---|
| Dialled number or calling identifier | The term dialled number does not exclude the number has been selected otherwise, e.g., as part of selecting a digital contact of a digital contact book application residing on a UE. Alternatively, these numbers or digits can be received from an internal application, external interface.<br>These numbers can be part of a string, where the string can include digits or can be alphanumeric. This string can be encoded as a URI (Uniform Resource Identifier).<br>For example, a telephone number that is dialed or otherwise submitted to make a call. |
| Registered for emergency services | A UE is registered for emergency services if it has successfully completed initial registration for emergency services or if it has only one Protocol Data Unit (PDU) session established which is for emergency services. |
| Attached for emergency bearer services | A UE is attached for emergency bearer services if it has only a Packet Data Network (PDN) connection for emergency bearer services established. |
| Limited service state | At least one of EMM-DEREGISTERED.LIMITED-SERVICE, EMM-REGISTERED.LIMITED-SERVICE, 5GMM-DEREGISTERED.LIMITED-SERVICE, 5GMM-REGISTERED.LIMITED-SERVICE, GMM-DEREGISTERED.LIMITED-SERVICE, and GMM-REGISTERED.LIMITED-SERVICE. |
| Emergency registered | Depending on the core network. Emergency registered, if the core network is the EPS, includes attached for emergency bearer services. Emergency registered, if the core network is the 5GS, comprises registered for emergency services. |

TABLE 2-continued

| Term | Brief Description |
|---|---|
| emergency attached | Depending on the core network. Emergency attached, if the core network is the EPS, comprises attached for emergency bearer services. Emergency attached, if the core network is the 5GS, comprises registered for emergency services. |
| Predefined identifier | A URN, e.g. a well-known URN. |

2.1 Emergency Service Types

Emergency services may be identified by emergency numbers. Emergency numbers can be tied to emergency service types. Examples of emergency service types include police, ambulance, fire brigade, marine guard, mountain rescue, or any other emergency service type.

Regulators have the authority to define emergency services. Typically, a regulator reserves a number and associates an emergency service description with the number. The reserved number is referred to as an emergency number. For certain emergency service descriptions, it is straightforward to associate the emergency service description with an emergency service type. For other emergency service descriptions, it is not straightforward to associate the emergency service description with an emergency service type.

Emergency service types can be expressed in a category, represented by a binary information element. One or more bits of the category may be set to '1' to indicate an emergency service type. Alternatively, emergency service types can be expressed using a URN. A URN can take the form "urn:service:sos[.optional-dot-separated-labels-follow]", e.g., "urn:service:sos.police" or "urn:service:sos.child.support".

2.2 Usage of Emergency Services Types

The UE, when detecting that an emergency number is dialled that matches an emergency number for a country, includes the emergency service type in the call setup or session setup message.

The emergency service type is included regardless of whether the UE is in limited service mode or not. A UE in limited service mode may not access services the UE has subscribed to. A UE in limited service mode can typically only invoke emergency services.

A UE is in limited service mode when it is in the limited service state. Subsequently, the UE can become emergency attached with an EPC network or emergency registered with a 5GC network, attached for emergency bearer services or registered for emergency services.

2.3 NAS (Non-Access Stratum) Messages & Procedures

In some examples, a UE registers or attaches with a network before the UE can use (subscribed) services. The UE sends and receives NAS messages when registering or attaching with the network. In 5GS, a NAS message to request registration may include a REGISTRATION request message. In EPS, a NAS message to request registration may include a ATTACH request message. In response to a registration request the UE may receive a registration accept message. In 5GS, a NAS message corresponding to a registration accept message may include a REGISTRATION ACCEPT message. In EPS, a NAS message corresponding to a registration accept message may include a ATTACH ACCEPT message.

2.4 Deriving a URN as an Emergency Service Type

The UE may receive an emergency number and associated information from which the UE can derive a URN. The derived URN represents the emergency service type. The derived URN can be included in a SIP INVITE message when using the IMS via the PS domain to initiate an emergency session.

Emergency number and associated information from which the UE can derive a URN can be optionally provisioned via the Extended (Local) Emergency Number List (EENL) information element (IE).

Emergency number and associated information from which the UE can derive a URN can be optionally provisioned via the (Local) Emergency Number List (ENL) IE.

The EENL IE can be included in a ATTACH ACCEPT message, a REGISTER ACCEPT message, a TRACKING AREA UPDATE ACCEPT message, registration accept message, attach accept message or tracking area update accept message.

2.5 EENL IE

The EENL as defined in 3GPP TS 24.301, is reproduced below:

The purpose of this information element is to encode one or more local emergency number(s) together with a sub-services field containing zero or more sub-services of the associated emergency service URN. An emergency service URN is a service URN with top level service type of "sos" as specified in IETF Request for Comments (RFC) 5031.

EXAMPLE 1

If the associated emergency service URN is "urn:service:sos.gas", there is only one sub-service provided in the sub-services field which is "gas".

EXAMPLE 2

If the associated emergency service URN is "urn:service:sos", there is no sub-services provided in the sub-services field and the length of the sub-services field is "0".

NOTE: The associated emergency service URN can be a country-specific emergency service URN as defined in 3GPP TS 24.229.

The Extended Emergency Number List information element is coded as shown below.

The Extended Emergency Number List IE is a type 6 information element with a minimum length of 6 octets and a maximum length of 65536 octets.

| 8 | 7 | 6 | 5 | 4 | 3 | 2 | 1 | |
|---|---|---|---|---|---|---|---|---|
| colspan | | | | | | | | |

| | |
|---|---|
| Extended Emergency Number List IEI | octet 1 |
| Length of Extended Emergency Number List IE contents | octet 2<br>octet 3 |
| Length of 1$^{st}$ Emergency Number information (Note 1) | octet 4 |
| Number digit 2      Number digit 1 | octet 5<br>(Note 2) |
| Number digit 4      Number digit 3 | octet 6* |
| :      : | : |
| (Note 3) | octet j − 1* |
| Length of 1st sub-services field (Note 4) | octet j |
| sub-services field | octet j + 1*<br>(Note 5)<br>octet k − 1* |
| Length of 2$^{nd}$ Emergency Number information (Note 1) | octet k* |
| Number digit 2      Number digit 1 | octet k + 1*<br>(Note 2) |
| Number digit 4      Number digit 3 | octet k + 2* |
| :      : | : |
| (Note 3) | octet l − 1* |
| Length of 2$^{nd}$ sub-services field (Note 4) | octet l* |
| sub-services field | octet l + 1*<br>(Note 5)<br>octet m − 1* |
| Length of 3$^{rd}$ Emergency Number information (Note 1) | octet m* |
| Number digit 2      Number digit 1 | octet m + 1*<br>(Note 2) |
| Number digit 4      Number digit 3 | octet m + 2* |
| :      : | : |
| (Note 3) | octet n − 1* |
| Length of 3$^{rd}$ sub-services field (Note 4) | octet n* |
| sub-services field | octet n + 1*<br>(Note 5)<br>octet o* |

NOTE 1: The length shall contain the number of octets used to encode the number digits.

NOTE 2: The number digit(s) in octet 5 precedes the digit(s) in octet 6 etc. The number digit, which would be entered first, is located in octet 6, bits 1 to 4. The contents of the number digits are coded as shown in Table 10.5.118 of 3GPP TS 24.008.

NOTE 3: If the emergency number contains an odd number of digits, bits 5 to 8 of the last octet of the respective emergency number shall be filled with an end mark coded as "1111".

NOTE 4: The length shall contain the number of octets used to encode the sub-services field.

NOTE 5: The characters of the sub-services of the associated emergency service URN shall be coded in accordance to 3GPP TS 23.038 and the first character starts in octet j+1, l+1 or n+1.

EXAMPLE 3

If the associated emergency service URN is "urn:service:sos.police.municipal", the sub-services field contains "police.municipal" and the first character is "p".

2.6 SIP Messages

The SIP protocol includes request messages and response messages. SIP messages (request or response) are structured to include one or more header fields, followed by a body. The body may include zero or more bodies. A non-limiting example of a body is an Extensible Markup Language (XML) document or a SIP message or a fragment of a SIP message. Bodies are typed: a SIP message contained in another SIP message's body is typed message/sip, a SIP message fragment contained in another SIP message's body is typed message/sipfrag.

3. Issues 3.0 High Level Issue

It has been proposed to delete the EENL (received from a first PLMN) upon successful registration with a second PLMN in the same country. If the EENL is deleted (and no EENL is received from the second PLMN in the same country), the UE may no longer detect that a dialled number is an emergency number, if the emergency number was included in the deleted EENL.

It is assumed that after successful registration, the second PLMN can detect whether a call to a dialled number is to be treated as emergency number (by means of network detected emergency call procedures).

However, if the second PLMN does not perform network detected emergency call procedures, the call may not be detected as emergency even though it was configured by a first PLNM by means of an EENL.

Further issues exist when the UE is in a limited service mode or when the UE attempts the call via WLAN to a network node of a third PLMN (in a different country). In the case of WLAN, if a 3GPP access is available the emergency call should be made over 3GPP access. Not having the EENL list may mean the UE can no longer detect that a dialled number is an emergency number, and the UE may attempt the undetected emergency call over the WLAN of the third PLMN in the different country.

3.1 (Emergency) Service Type not Regulated

Each PLMN in a country may tie or may associate an emergency number to or with a different emergency service type. The concept of PLMN specific emergency service types or unregulated (emergency) service types causes the following issues:

A UE in a limited service mode, emergency attaching to a second PLMN, after having received emergency numbers and emergency service types from a first PLMN, may identify the emergency call with an emergency service type that is not recognized by second PLMN. This may cause the second PLMN to reject the emergency call or incorrectly route the emergency call.

A UE, attaching using a legacy network node (e.g. MME) to a second PLMN (e.g. when roaming), after having received emergency numbers and emergency service types from a first PLMN, may identify the emergency call with an emergency service type that is not recognized by second PLMN. This may cause the second PLMN to reject the emergency call or incorrectly route the emergency call.

In general, this means that a PLMN B in the same country as PLMN A, may not accurately route a call or session including an emergency service type identifier (e.g. the identifier in the aforementioned URN format), if the URN is provisioned at the UE by PLMN A.

3.2 Too Many Number Combinations Triggering Limited Service State Emergency Call With an increase of the number of digit strings that can be matched to an emergency number at the UE, there may be an increase in pocket dialled emergency calls (emergency calls dialled while the UE is in a pocket, purse, or other container, or any emergency calls not intended to be made by a user of the UE). Regulators may grow concerned about the number of failed emergency calls due to involuntarily or erroneously initiated emergency call.

4 Proposed Implementation(s)

4.0 General 4.0.1 General

Figure 2:
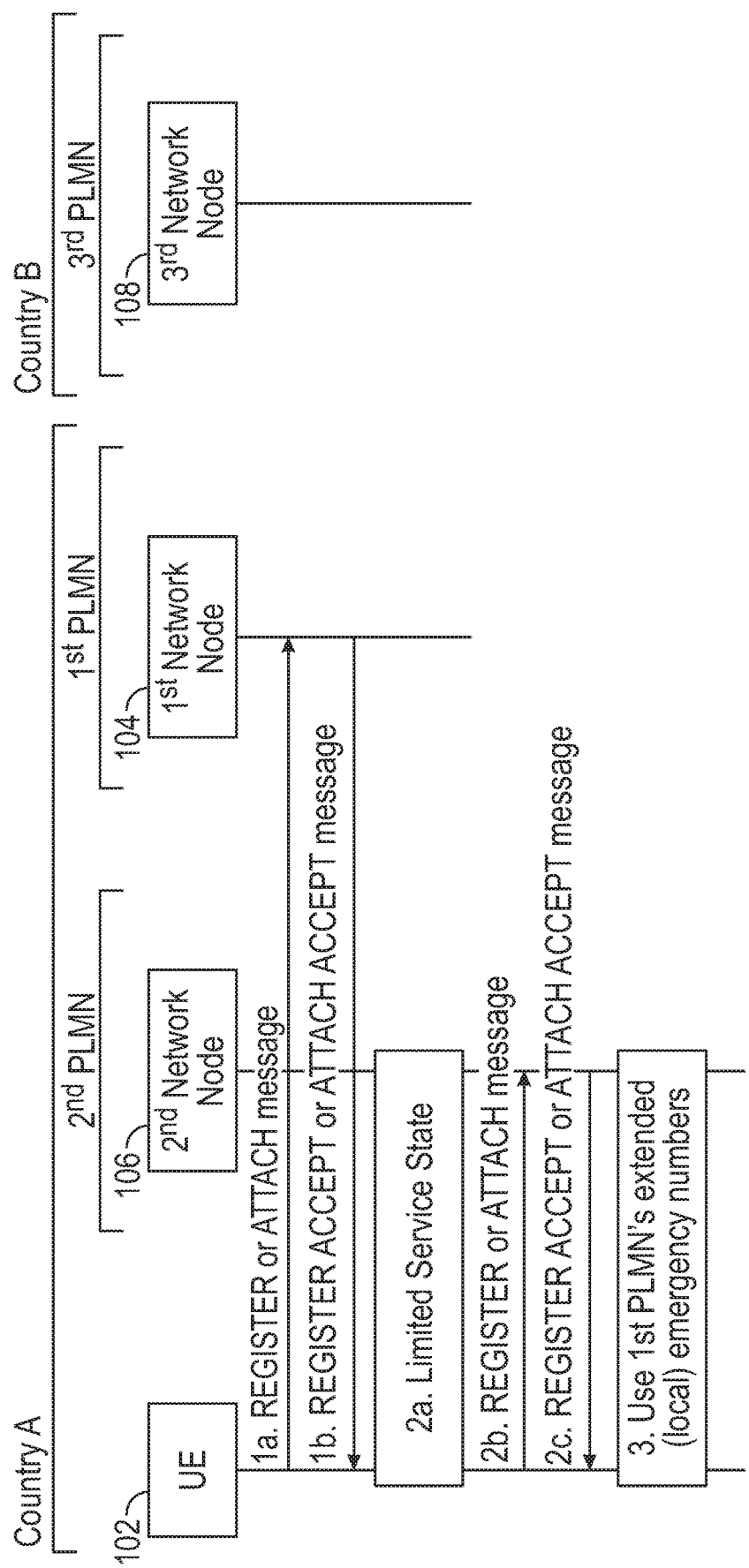
Figure 3:
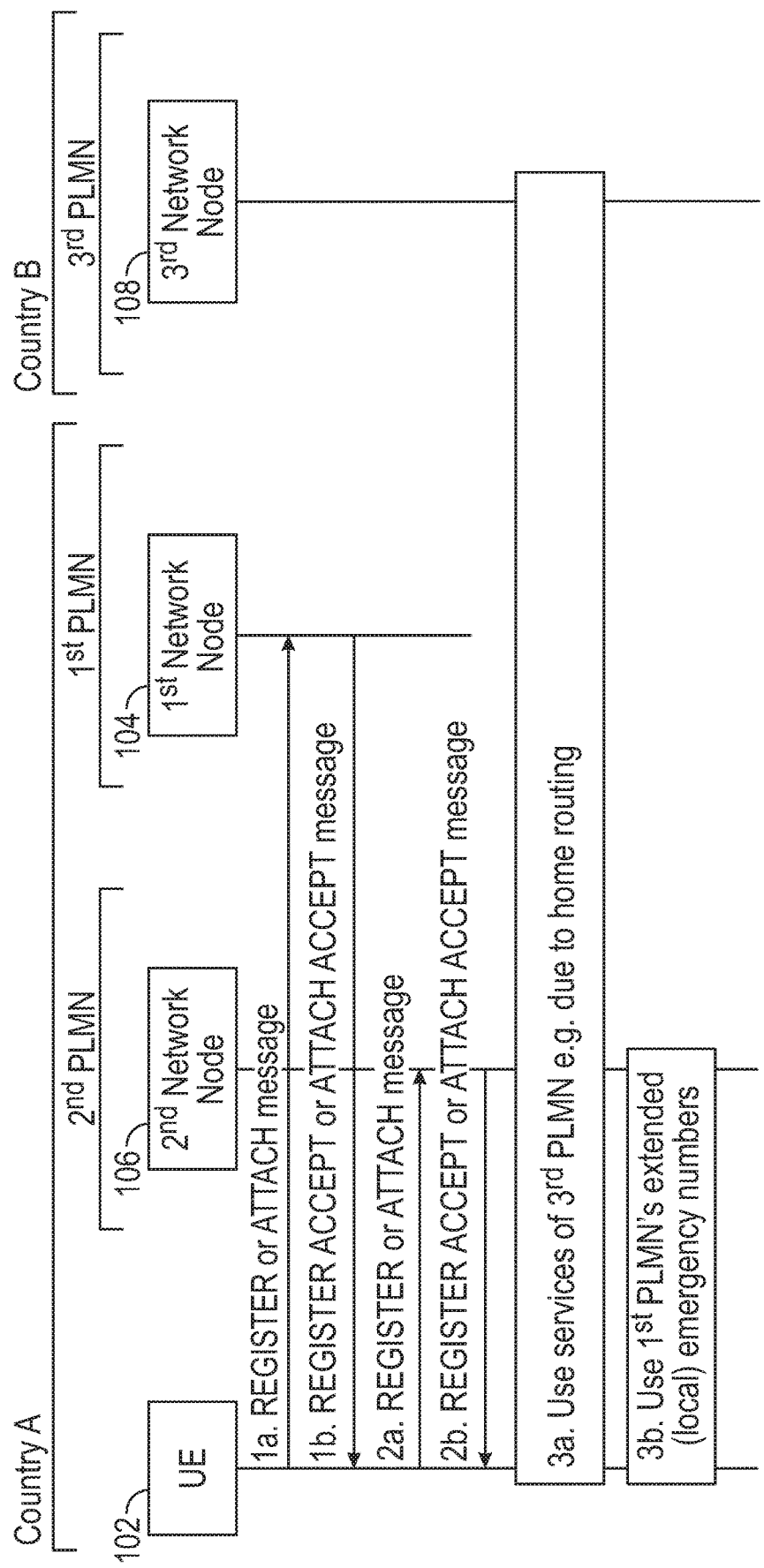

Sections 4.1 and 4.2 address the issues in section 3.1. FIGS. 1-3 show three example scenarios in which techniques or mechanisms according to some implementations may be employed.

4.0.2 Scenario 1

FIG. 1 shows an exchange of messages between a UE 102 and network nodes according to Scenario 1. FIG. 1 shows usage of (extended) local emergency numbers. The following refers to tasks shown in FIG. 1.

Task 1a: The UE 102 attempts to register by sending an ATTACH message or REGISTER message with a network node 104 of a $1^{st}$ PLMN in country A.

Task 1b: The network node 104 accepts the registration attempt. The network node 104 sends at least one emergency number and associated information from which the UE 102 can derive a URN. The at least one emergency number and the associated information can be sent in a mobility management message. The UE 102 receives the mobility management message from the network node 104. The mobility management message can include a registration accept message. The registration accept message can include an ATTACH ACCEPT message or REGISTER ACCEPT message. The mobility management message received by the UE 102 contains the information sent by the network node 104.

Task 2a: The UE 102 attempts to register by sending an ATTACH message or REGISTER message to a network node 106 of a $2^{nd}$ PLMN in country A.

Task 2b: The network node 106 accepts the registration attempt. The UE 102 does not receive at least one emergency number and associated information from which to derive a URN.

Task 3: The UE 102 continues to use at least the at least one emergency number received from the network node 104 of the 1st PLMN to detect if a dialled number in country A is an emergency number.

4.0.2 Scenario 2

FIG. 2 shows an exchange of messages between a UE 102 and network nodes according to Scenario 2. FIG. 2 shows usage of (extended) local emergency numbers. The following refers to tasks shown in FIG. 2.

Task 1a: The UE 102 attempts to register by sending an ATTACH message or REGISTER message with the network node 104 of the 1st PLMN.

Task 1b: The network node 104 accepts the registration attempt. The network node 104 sends at least one emergency number and associated information from which the UE 102 can derive a URN. The at least one emergency number and associated information can be sent in a mobility management message. The UE 102 receives the mobility management message from the network node 104. The mobility management message can include a registration accept message. The registration accept message can include an ATTACH ACCEPT message or REGISTER ACCEPT message. The mobility management message received by the UE 102 contains the information sent by the network node 104.

Task 2a: The UE 102 may enter a limited service state or a limited service mode.

Task 2b: The UE 102 attempts to be registered for emergency services by sending, to the network node 106 of the $2^{nd}$ PLMN, a REGISTER message indicating emergency, or the UE 102 attempts to be attached for emergency bearer services by sending, to the network node 106 of the $2^{nd}$ PLMN, an ATTACH message indicating emergency.

Task 2c: The network node 106 accepts the registration attempt. The UE 102 does not receive at least one emergency number and associated information from which to derive a URN.

Task 3: The UE 102 continues to use at least the at least one emergency number received from the network node 104 of the 1st PLMN to detect if a dialled number in country A is an emergency number.

4.0.4 Scenario 3

FIG. 3 shows an exchange of messages between a UE 102 and network nodes according to Scenario 3. FIG. 3 shows usage of (extended) local emergency numbers. The following refers to tasks shown in FIG. 3.

Task 1a: The UE 102 attempts to register by sending an ATTACH message or REGISTER message to the network node 104 of the 1st PLMN.

Task 1b: The network node 104 accepts the registration attempt. The network node 104 sends at least one emergency number and associated information from which to derive a URN. The at least one emergency number and associated information can be sent in a mobility management message. The UE 102 receives the mobility management message from the network node 104. The mobility management message can include a registration accept message. The registration accept message can include an ATTACH ACCEPT message or REGISTER ACCEPT message. The mobility management message received by the UE 102 contains the information sent by the network node 104.

Task 2a: If the UE 102 did not enter a limited service state, the UE 102 may not indicate emergency in the ATTACH message or REGISTER message. The UE 102 attempts to register by sending an ATTACH message or REGISTER message to the network node 106 of the $2^{nd}$ PLMN (had the UE entered limited service state or limited service mode, the ATTACH message may have indicated emergency or the REGISTER message may have indicated emergency).

Task 2b: The network node 106 accepts the registration attempt. The UE 102 does not receive at least one emergency number and associated information from which to derive a URN.

Task 3a: The UE 102 may optionally connect via WLAN to a network node 108 in a $3^{rd}$ PLMN in a different country B, e.g., the home PLMN in the home country.

Task 3b: The UE 102 continues to use at least the at least one emergency number received from the network node 104 of the 1st PLMN to detect if a dialled number in country A is an emergency number.

4.1 Ignore the Association Between an Emergency Number and the Information from which to Derive a URN

4.1.0 General

To protect a first PLMN in the same country against receiving unknown URNs or URNs the first PLMN has not configured at the UE 102, the UE 102 may ignore the association between an emergency number and the information from which to derive a URN. The UE 102 may receive a list including at least one emergency number and associated information from which to derive a URN. The list may be received from a network node that is part of a second PLMN in the same country.

The UE may determine that the first and second PLMNs are in the same country by checking if the mobile country code (MCC) portion of the PLMN code associated with the first PLMN is part of the set of MCC codes that also includes the MCC portion of the PLMN code associated with the second PLMN. For most countries, the size of the set of MCC codes is one, i.e., the UE can effectively check if the MCC portion of the PLMN code associated with the first PLMN is equal to the MCC portion of the PLMN code associated with the second PLMN.

Rather than clearing the list, the list is kept (i.e., not cleared or not deleted or not replaced with an empty list) at the UE 102. The advantage is that the UE 102 continues to be able to detect emergency numbers valid in the country. Furthermore, when the network to which the UE 102 is currently attached to or currently registered with is the second PLMN from which the UE received the list, the UE 102 would be able to use the information from which to derive a URN when the UE 102 returns to that second PLMN (e.g., in case where the UE 102 is in the limited service mode or limited service state or in case the PLMN selected for emergency calls over WLAN in the second PLMN).

"Emergency number and associated information from which the UE can derive a URN" or "Emergency number and associated URN" can be received at the UE in an EENL IE. Alternatively, "Emergency number and associated URN" can be derived from the EENL IE. "Emergency number and associated information from which the UE can derive a URN" or "Emergency number and associated URN" can be stored in the UE. "Emergency number and associated information from which the UE can derive a URN" or "Emergency number and associated URN" can be obtained from the USIM or UICC or other persistent storage.

Figure 4:
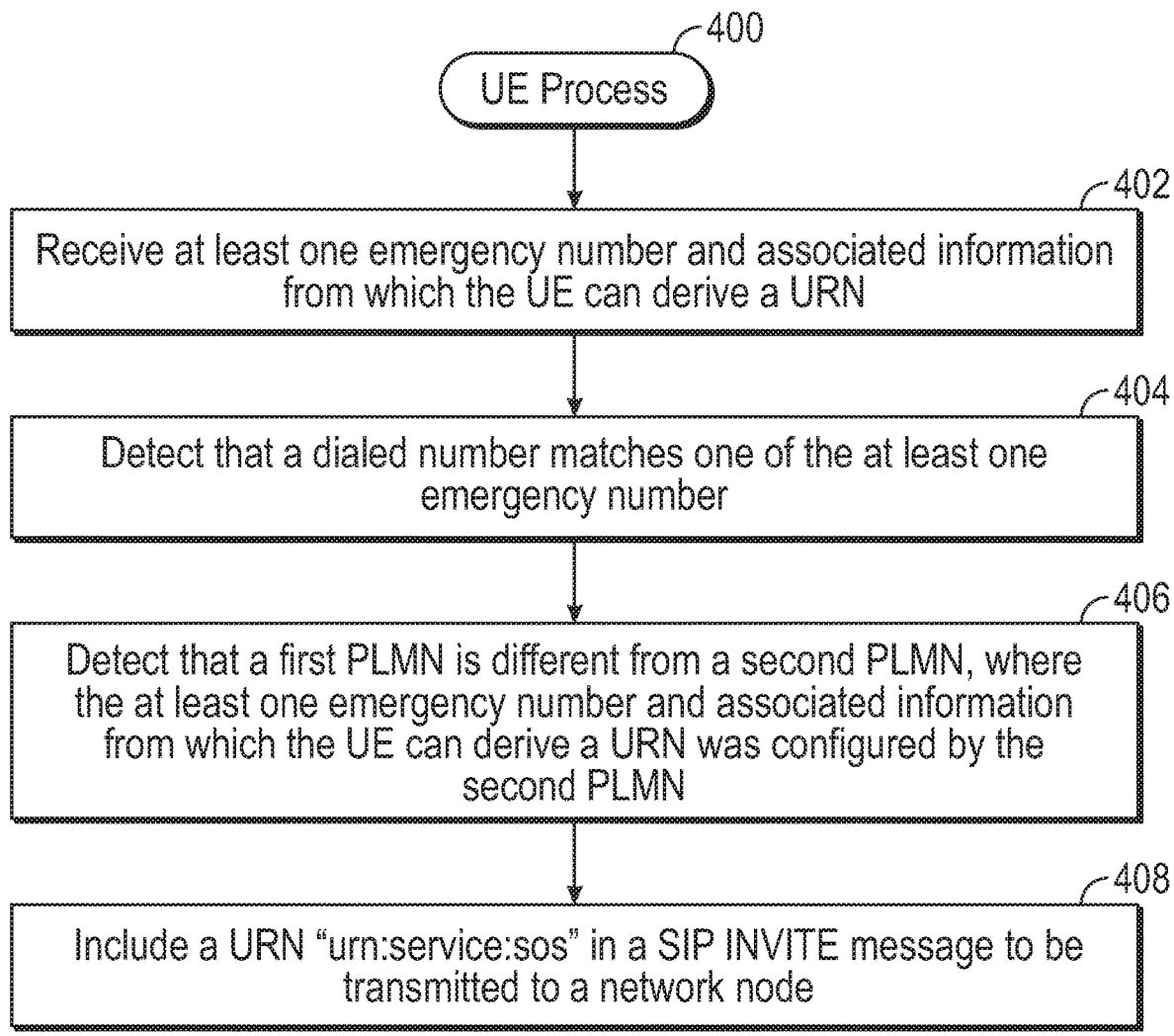
FIGS. 4-8 are flow diagram of various processes according to some implementations of the present disclosure.

FIG. 4 is a flow diagram of a process 400 that can be performed by the UE 102, according to first embodiments. The UE 102 receives (at 402) at least one emergency number and associated information from which the UE can derive a URN. In some examples, the associated information can include the URN itself. In other examples, the associated information can include other information that the UE 102 can use to derive the URN.

The UE 102 detects (at 404) that a dialled number matches one of the at least one emergency number.

The UE 102 detects (at 406) that a first PLMN is different from a second PLMN, where the at least one emergency number and associated information from which the UE can derive a URN was configured by the second PLMN.

The UE includes (at 410) the URN "urn:service:sos" in a SIP INVITE message to be transmitted to a network node.

In some examples, the at least one emergency number and associated information from which the UE can derive a URN is received from one of a Universal Subscriber Identity Module (USIM) or the second PLMN.

In further examples, the at least one emergency number and associated information from which the UE can derive a URN is received from one of a persistent memory, a Universal Integrated Circuit Card (UICC), an application on a UICC, a USIM, an IMS SIM (ISIM), or the second PLMN.

In some examples, the URN being configured by the second PLMN includes receiving the URN from the second PLMN.

In some examples, the at least one emergency number and associated information from which the UE can derive the URN is received in a first Extended Emergency Number List (EENL) Information Element (IE), the EENL IE.

In further examples, the at least one emergency number and associated information from which the UE can derive the URN is received from one of a persistent memory, a UICC, an application on a UICC, a USIM, or an ISIM.

In some examples, the EENL IE is received from a network node that is part of the second PLMN.

In further examples, the EENL IE is received from a network node that is part of a core network of the second PLMN.

In some examples, the SIP INVITE message further includes dialled digits that make up the calling identifier. The dialled digits can be included in a header field of the SIP INVITE message or the dialled digits can be included in the body of the SIP INVITE message or body fragment part of the body of the SIP INVITE message. If the dialled digits are included in the body or body fragment (a single body is included in the SIP message's body, whereas multiple bodies to be included are each included in a portion or fragment of the SIP message's body), the content of the body to include the dialled digits is typed. Examples of these types are "message/sip" or "message/sipfrag". Other examples may exist. A network node in the PLMN receiving the dialled digits may be able to derive a service type from the dialled digits.

In some examples, the first PLMN is to be used to request an emergency service identified by the emergency number.

In further examples, the UE 102 can use a WLAN for sending the SIP INVITE message.

In some examples, the "at least one emergency number and associated information from which the UE can derive a URN" are not cleared when no new "at least one emergency number and associated information from which the UE can derive a URN" is received, while in the same country. While mapping of emergency number to emergency service type may not be applicable to all PLMNs in the same country, the other PLMNs do not receive emergency service type that is not applicable at that other PLMN.

In additional examples, a device (e.g., the UE 102) receives, from a first network, at least one emergency identifier and associated information from which the device is able to derive an indicator (e.g., URN) of an emergency service type. The device stores the at least one emergency identifier and associated information. The device detects that a calling identifier received as part of initiating a call matches an emergency identifier. The device detects that the device is in the first network. In response to the detecting, the device uses the stored associated information to derive the indicator. The device sends a call initiation indication containing the indicator.

In further examples, detecting that the device is in the first network includes detecting that the device is in the second network prior to detecting that the device is in the first network.

In other examples, a non-transitory machine-readable medium comprises instructions that upon execution cause a device to receive, from a first network, at least one emergency identifier and associated information from which the device is able to derive an indicator of an emergency service type; after the receiving, detect that the device is in a second network different from the first network; and keep the at least one emergency identifier and associated information received from the first network in response to detecting that the device is in a second network different from the first network.

In further examples, the keeping is further in response to detecting, by the device, that the second network did not provide any emergency identifier to the device.

4.1.1 Equivalent PLMNs

In the first embodiments described in section 4.1.0, the detecting that the first PLMN is different from the second PLMN includes detecting that the first PLMN's PLMN code is not equal to the second PLMN's PLMN code.

The UE 102 may be configured with further PLMNs that are considered equivalent. Each further PLMN is identified with a unique, corresponding PLMN code. Each further PLMN's PLMN code may have been configured by receiving the PLMN code in one of an ATTACH ACCEPT message or REGISTRATION ACCEPT message.

In further examples, the detecting that the first PLMN is different from the second PLMN (as described in section 4.1.0) includes detecting that the first PLMN's PLMN code is not equal to a third PLMN's PLMN code, the third PLMN being an equivalent PLMN of the second PLMN.

4.1.2 Well-Known Emergency Service Types

Figure 5:
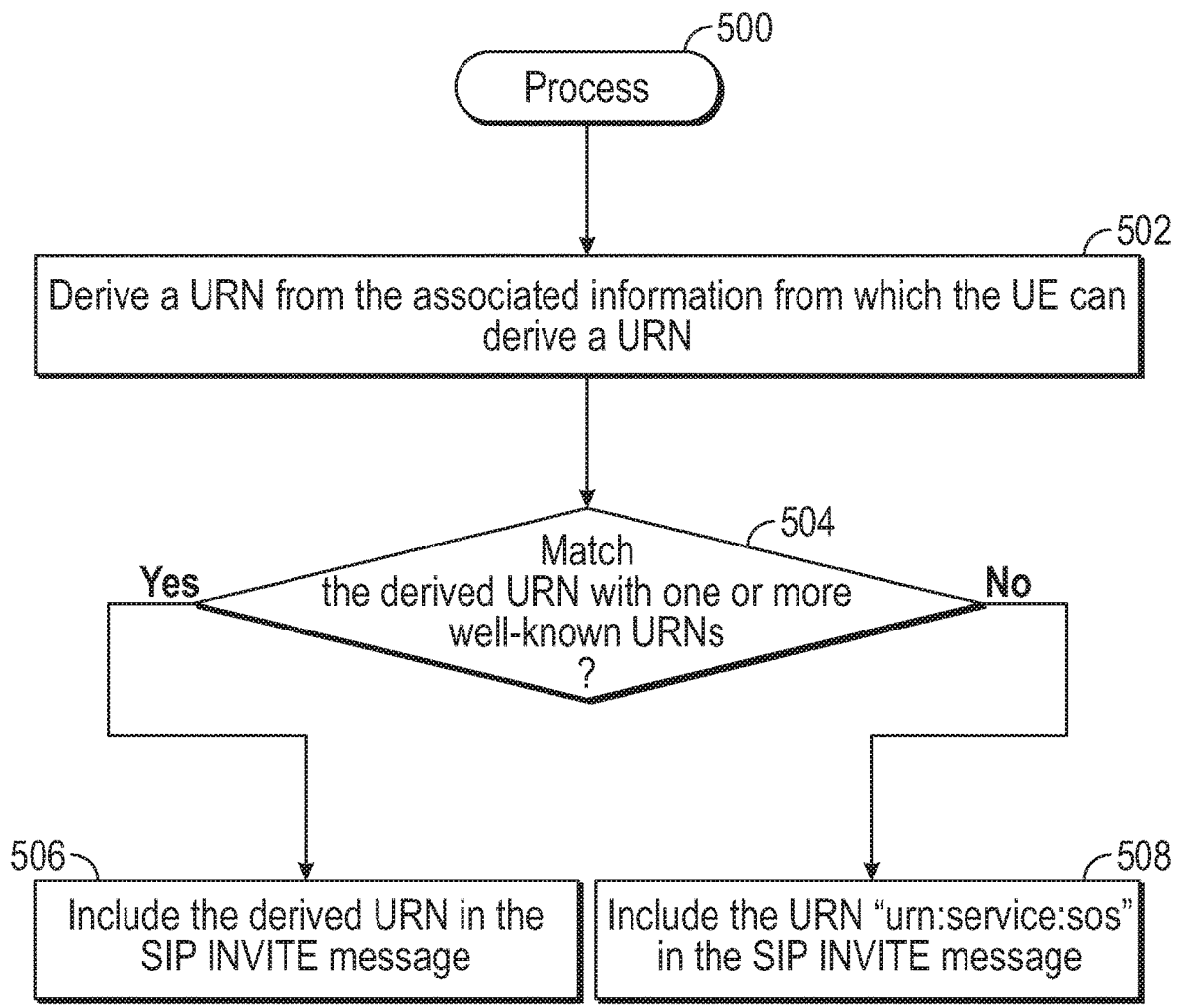

In some examples, FIG. 5 shows a process 500 of the UE including (at 410 in FIG. 4) the URN "urn:service:sos" in the SIP INVITE message according to the first embodiments. The process 500 includes deriving (at 502) a URN from the associated information from which the UE can derive a URN.

The process 500 further includes matching (at 504) the derived URN with one or more well-known URNs. If the derived URN matches at least one of the one or more well-known URNs, the process 500 includes (at 506) the derived URN in the SIP INVITE message.

If the derived URN does not match at least one of the one or more well-known URNs, the process 500 includes (at 508) the URN "urn:service:sos" in the SIP INVITE message.

Thus, the UE 102 includes ing the URN "urn:service:sos" in the SIP INVITE message if the derived URN does not match at least one of the one or more well-known URNs.

In further examples, the UE 102 including the URN "urn:service:sos" in the SIP INVITE message includes matching the URN with one of the one or more well-known URNs, and if the URN matches at least one of the one or more well-known URNs, including the URN in the SIP INVITE message.

In some examples, the one or more well-known URNs include but are not limited to: "urn:service:sos", "urn:service:sos.ambulance", "urn:service:sos.police", "urn:service:sos.fire", "urn:service:sos.marine", "urn:service:sos.mountain", and so forth.

In further examples, the one or more well-known URNs further or alternatively include "urn:service:sos.ecall-.manual", "urn:service:sos.ecall.automatic", and so forth.

4.1.3 PLMN-Specific Emergency Service Types

Figure 6:
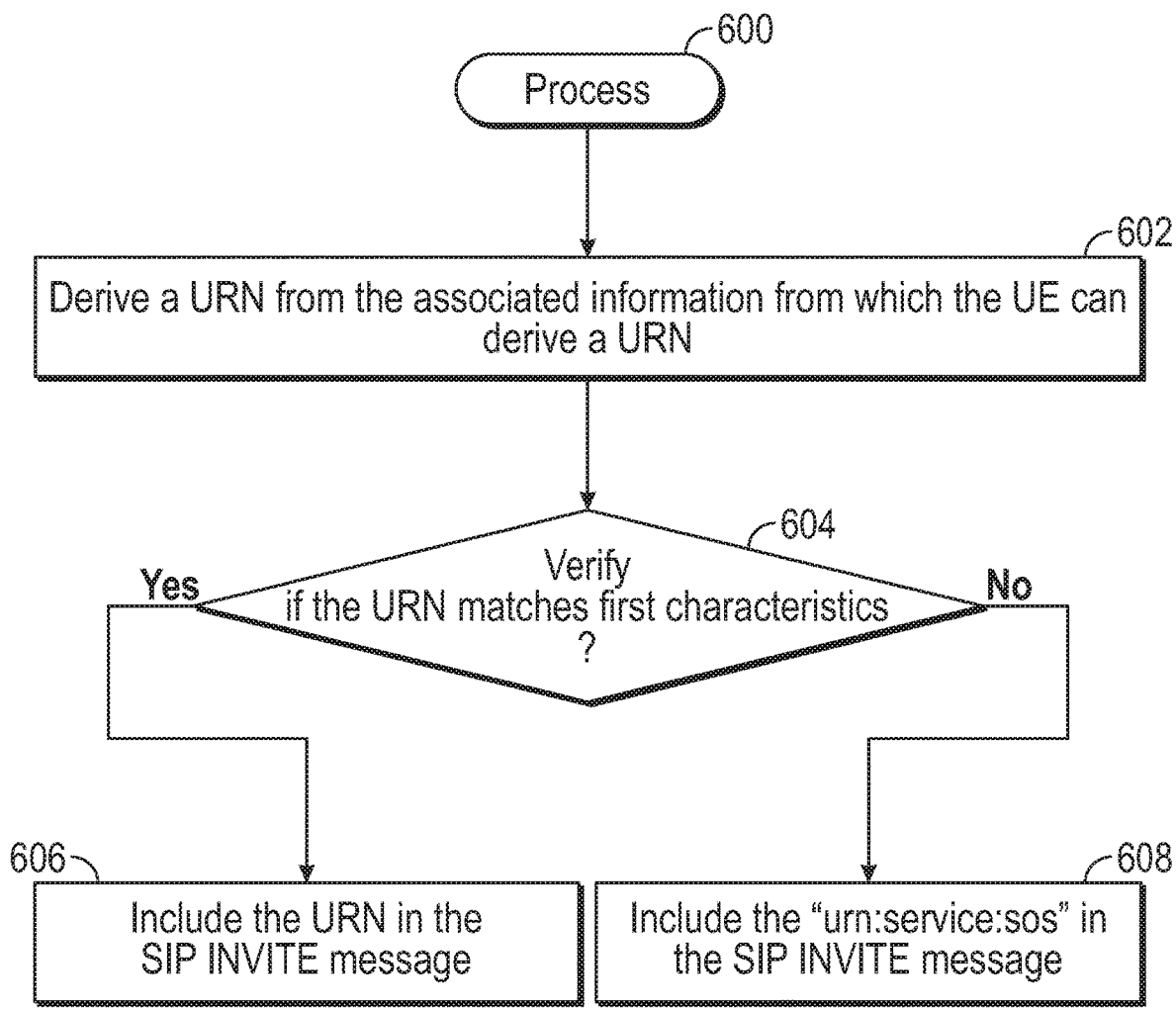

Section 4.1.2 above refers to implementations for including a URN "urn:service:sos" in a SIP INVITE message based on comparison to well-known emergency service types. In further examples, FIG. 6 shows a process 600 of another technique of the UE 102 according to the first embodiments for including (at 410 in FIG. 4) the URN "urn:service:sos" in the SIP INVITE message. The process 600 includes deriving (at 602) a URN from the associated information from which the UE can derive a URN. The process 600 verifies (at 604) if the URN matches first characteristics. If the URN matches first characteristics, the process 600 includes (at 606) the URN in the SIP INVITE message.

In further examples, the UE including the "urn:service:sos" includes verifying if the URN does not match first characteristics, and if the URN does not match first characteristics, including (at 608) the "urn:service:sos" in the SIP INVITE message.

In some examples, the first characteristics include "urn:service:sos", "urn:service:sos.ambulance", "urn:service:sos.police", "urn:service:sos.fire", "urn:service:sos.marine", "urn:service:sos.mountain", and so forth.

In some examples, matching the first characteristics includes matching the first characteristics of the URN with "urn:service:sos.country-specific".

4.1.4 Using the PLMN (or its Equivalent) from which the EENL was Received

Figure 7:
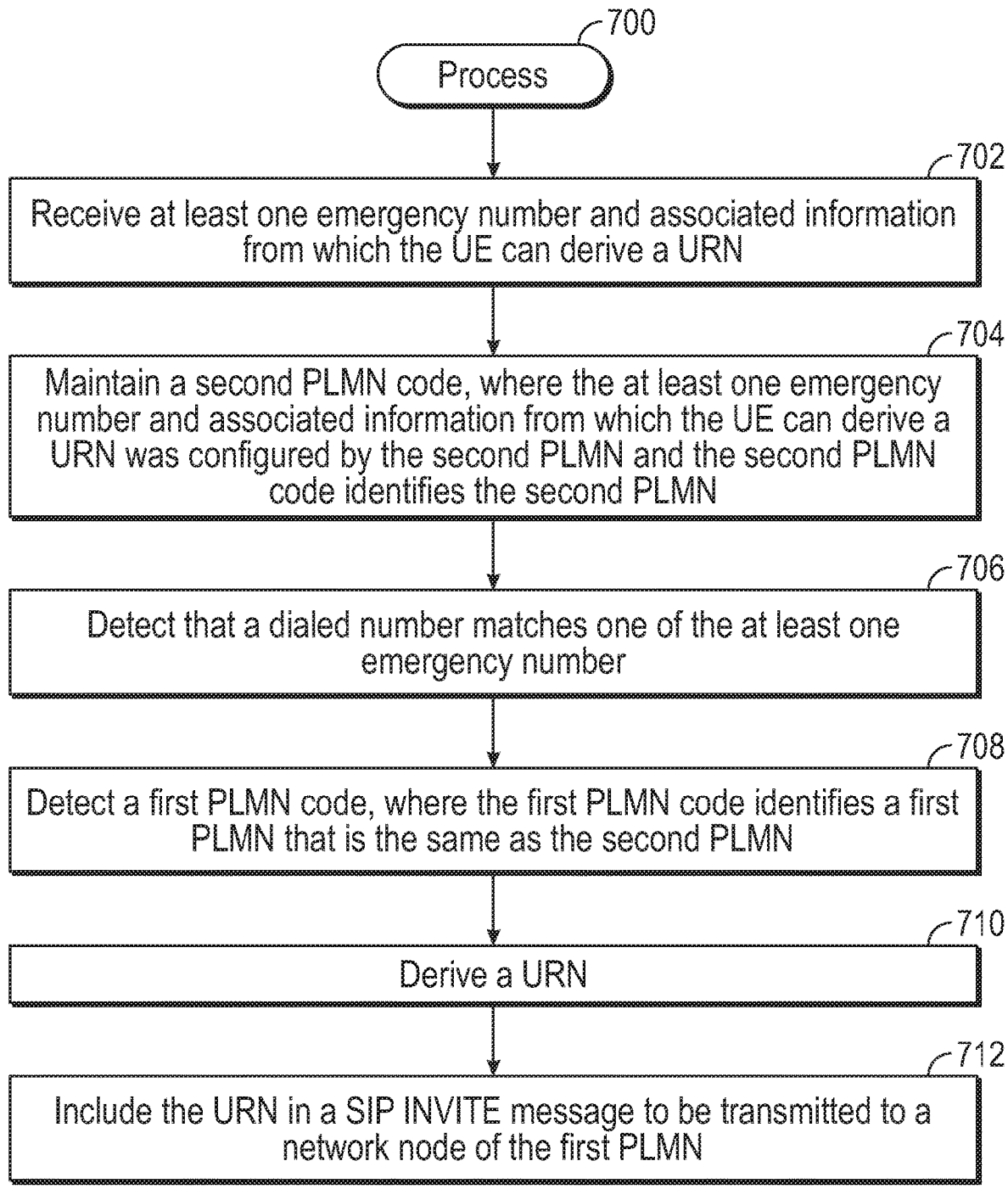

FIG. 7 shows a process 700 performed by the UE 102 according to second embodiments of the present disclosure.

The UE 102 receives (at 702) at least one emergency number and associated information from which the UE can derive a URN. The associated information can be the URN itself, or other information from which the UE can derive the URN.

The UE 102 maintains (at 704) a second PLMN code, where the at least one emergency number and associated information from which the UE can derive a URN was configured by the second PLMN and the second PLMN code identifies the second PLMN.

The UE 102 detects (at 706) that a dialled number matches one of the at least one emergency number. The UE 102 detects (at 708) a first PLMN code, where the first PLMN code identifies a first PLMN that is the same as the second PLMN.

The UE 102 derives (at 710) a URN and includes (at 712) the URN in a SIP INVITE message to be transmitted to a network node of the first PLMN.

In some examples, the at least one emergency number and associated information from which the UE can derive a URN is received in a first Extended Emergency Number List (EENL) Information Element (IE), the EENL IE.

In further examples, the at least one emergency number and associated information from which the UE can derive a URN is received from one of a persistent memory, a UICC, an application on a UICC, a USIM, or an ISIM.

In some examples, the EENL IE is received from a network node that is part of the second PLMN.

In further examples, the EENL IE is received from a network node that is part of a core network of the second PLMN.

In some examples, the detecting that the first PLMN is the same as the second PLMN includes detecting that the first PLMN code is not equal to the second PLMN code.

The UE 102 may be configured with further PLMNs that are considered equivalent. Each further PLMN is identified with a unique, corresponding PLMN code. Each further PLMN's PLMN code may have been configured by the UE receiving the PLMN code in one of an ATTACH ACCEPT message or REGISTRATION ACCEPT message.

In some examples, the detecting that the first PLMN is the same as the second PLMN includes detecting that the first PLMN code is equal to a third PLMN code identifying an equivalent PLMN of the second PLMN.

4.1.5 Calls Via WLAN

To protect a 1st PLMN in a first country against call requests including emergency numbers valid in a second country, the UE 102 keeps emergency numbers the UE 102 has received while it is in the second country. The UE 102 may register with the 1st PLMN in the first country via a non-3GPP access network such as a WLAN.

In the examples of sections 4.1.0 to 4.1.4 according to the first and second embodiments, the third PLMN may not be known at the UE 102. The third PLMN is used for a call to an emergency number via a WLAN. Only an identifier used to identify a network element may be known. The network element can be identified by a "Emergency NAI (Network Access Identifier) for Limited Service State" or "IMSI (International Mobile Subscriber Identifier)-based Emergency NAI" or "ePDG (Evolved Packet Data Gateway) FQDN (Fully Qualified Domain Name) for emergency bearer services" or other identifier. Unless the PLMN that is connected via the network element is known, the techniques discussed in sections 4.1.0 to 4.1.4 are used. If the PLMN is not known, it is assumed that the PLMN is different from the second PLMN, and the techniques discussed in sections 4.1.0 to 4.1.4 are used.

4.2 Altering the Association Between an Emergency Number and the Information from which to Derive a URN To prevent the first PLMN in the same country from receiving an unknown URN, the UE 102 may alter the association between an emergency number and the information from which to derive a URN.

Rather than clearing the list, the list is kept at the UE 102. The advantage may be that the UE 102 continues to detect emergency numbers valid in the country.

Figure 8:
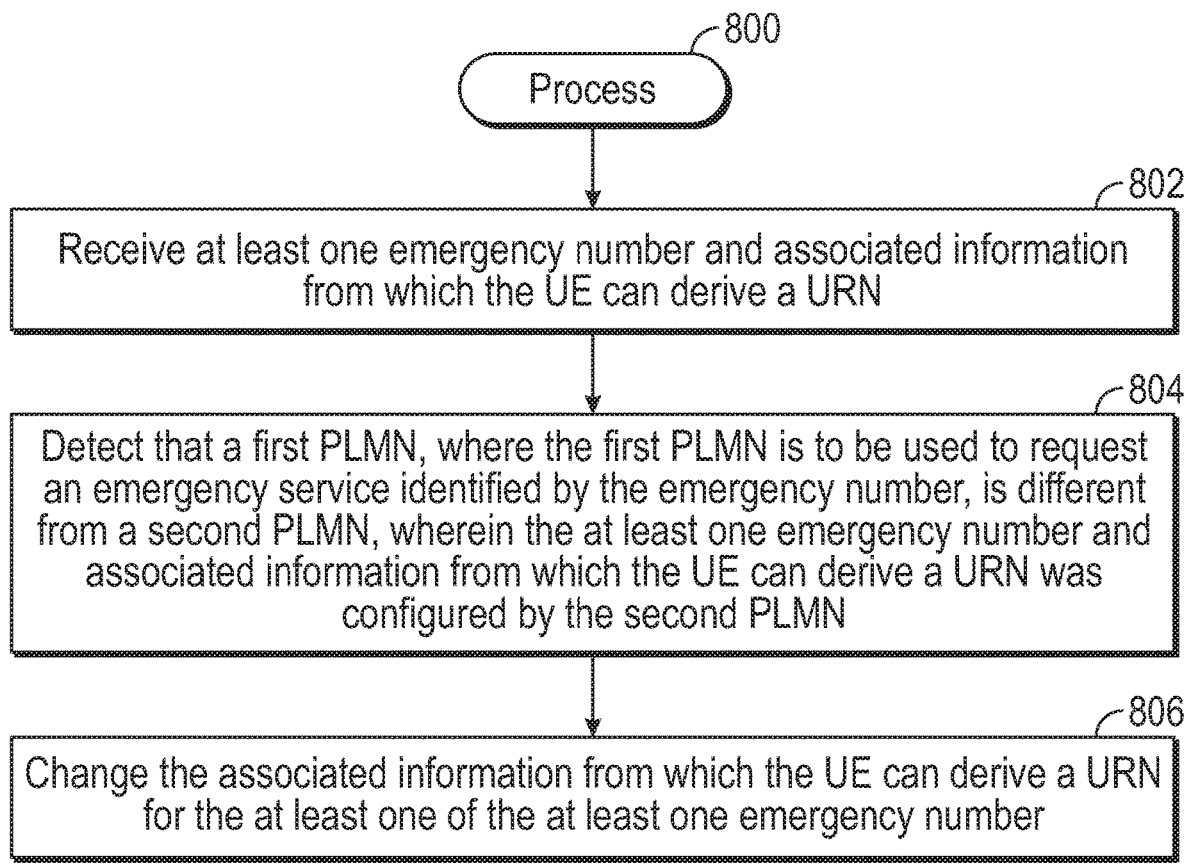

FIG. 8 is a flow diagram of a process 800 according to third embodiments. The UE receives (at 802) at least one emergency number and associated information from which the UE can derive a URN. The UE detects (at 804) that a first PLMN, where the first PLMN is to be used to request an emergency service identified by the emergency number, is different from a second PLMN, wherein the at least one emergency number and associated information from which the UE can derive a URN was configured by the second PLMN. The UE 102 changes (at 806) the associated information from which the UE can derive a URN for the at least one of the at least one emergency number.

In some examples, the at least one emergency number and associated information from which the UE 102 can derive a URN is received in a in a first Extended Emergency Number List (EENL) Information Element (IE), the EENL IE.

In further examples, the at least one emergency number and associated information from which the UE 102 can derive a URN is received from one of a persistent memory, a UICC, an application on a UICC, a USIM, or an ISIM.

In some examples, the EENL IE is received from a network node that is part of the second PLMN.

In further examples, the EENL IE is received from a network node that is part of a core network of the second PLMN.

In a variant of the third embodiments, the first EENL IE includes a first field representing the length of a sub-services field and the corresponding sub-services field, associated with the at least one emergency number, wherein sub-services field is used to derive the URN. Also, changing the associated information for at least one of the at least one emergency number comprises creating a second EENL IE including at least one of the at least one emergency number and an associated second field representing the length of a sub-services field, wherein the length of the sub-services field is set to the value zero If the length of the sub-services field is the value zero, the UE 102 derives the URN "urn:service:sos" when dialled digits match the emergency number associated with the "length of the sub-services" field set to the value zero.

4.3 Checking EENL Before Initiating Limited Service Mode Emergency Calls

4.3.0 General

Techniques according to this section address issues described in section 3.2.

In some countries it may not be desirable to enable a UE to recognize or detect all emergency numbers as eligible for limited service mode emergency calls.

However, making the detection dependent on whether the number is in EENL or ENL may not be correct because some countries include numbers suitable for inclusion in ENL only in the EENL.

4.3.1 Solutions

In some examples, techniques can add to an EENL IE an indication of whether a number can be used for emergency call detection while the UE 102 is emergency attached with a core network.

Alternatively, techniques can add to an EENL IE an indication of whether information associated with a number can be used for deriving a URN, and a derived URN can be included in a SIP INVITE when the UE 102 is emergency attached with a core network.

Alternatively, techniques can add to an EENL IE an indication of whether the UE 102 is permitted to send a SIP INVITE with URN derived from the EENL while the UE 102 is emergency attached with a core network, if a number matches an emergency number in the EENL.

In some examples, the UE emergency being attached with a core network includes the UE is emergency being registered with a core network.

In further examples, the UE is emergency being attached with a core network includes the UE considering itself emergency attached with the core network.

The various alternative techniques described in this section can be combined.

4.3.2 Indicator

4.3.2.1 Indicator in EENL

The indication (or indicator or bit) as discussed in section 4.3.1 can be encoded in the Extended Emergency Number List IE as one or more of the bits of the field "Length of $n^{th}$ Emergency Number information". For example, the indication can be one of the bits 8, 7, 6, or 5, as follows:

| 8 | 7 | 6 | 5 | 4 | 3 | 2 | 1 | |
|---|---|---|---|---|---|---|---|---|
| colspan Extended Emergency Number List IE | | | | | | | | octet 1 |
| | | | | [..] | | | | |
| Indication or indicator | | | | Length of $n^{th}$ Emergency Number information (Note 1) | | | | |
| Number digit 2 [..] | | | | Number digit 1 [..] | | | | |
| | | | | [..] | | | | |
| Length of $n^{th}$ sub-services field | | | | | | | | |
| sub-services field | | | | | | | | |
| Indication or indicator | | | | Length of $(n + 1)^{th}$ Emergency Number information (Note 1) | | | | |
| Number digit 2 [..] | | | | Number digit 1 [..] | | | | |
| Length of $(n + 1)^{th}$ sub-services field | | | | | | | | |
| sub-services field | | | | | | | | |

4.3.2.2 Indicator in Different IE

In further examples, the indication (or indicator or bit) as discussed in section 4.3.1 can be encoded in a different IE as one or more of the bits of the field associated with number digits:

| 8 | 7 | 6 | 5 | 4 | 3 | 2 | 1 | |
|---|---|---|---|---|---|---|---|---|
| | | | | IE [..] | | | | octet 1 |
| Indication or indicator | | | | Length of $n^{th}$ Emergency Number information (Note 1) | | | | |
| Number digit 2 [..] | | | | Number digit 1 [..] | | | | |
| | | | | [..] | | | | |
| Indication or indicator | | | | Length of $(n + 1)^{th}$ Emergency Number information (Note 1) | | | | |
| Number digit 2 [..] | | | | Number digit 1 [..] | | | | |

4.3.3 Further Details

The following described further details according to various implementations of the present disclosure. The UE 102 can receive at least one emergency number and associated information from which the UE can derive a URN and an indication. The UE 102 detects that a dialled number matches one of the one or more emergency numbers. The UE 102 detects, prior to sending one or more SIP request messages, whether the UE is emergency registered.

If the UE 102 detects the UE is emergency registered and depending on the indication, the UE 102 refrains from sending at least one of the one or more SIP request messages. Alternatively, if the UE detects the UE is not emergency registered and depending on the indication, the UE sends the one or more SIP request messages.

In the examples above, the at least one emergency number and associated information from which the UE can derive a URN is received in a in a first Extended Emergency Number List (EENL) Information Element (IE), the EENL IE.

In the examples above, the at least one emergency number and associated information from which the UE can derive a URN is received from one of a persistent memory, a UICC, an application on a UICC, a USIM, or an ISIM.

In the examples above, the EENL IE is received from a network node part of a first PLMN.

In the examples above, the EENL IE is received from a network node part of a core network of a first PLMN.

In further examples, the UE 102 is emergency registered if at least one of the following is satisfied:
  The UE 102 is emergency attached with an EPC network;
  The UE 102 considers itself emergency attached with an EPC network;
  The UE 102 is emergency registered with a 5G CN; or
  The UE 102 considers itself emergency registered with a 5G CN.

In additional examples, the UE 102 detects whether the UE is emergency registered by at least one of:
  Detecting whether the UE is non-emergency attached with an EPC network;
  Detecting whether the UE considers itself non-emergency attached with an EPC network;
  Detecting whether the UE is non-emergency registered with a 5G CN;
  Detecting whether the UE considers itself non-emergency registered with a 5G CN;
  Detecting whether the UE is in one of a limited service state or a limited service sub-state or limited service state or a limited service sub-state.
  Detecting whether the UE is attached for emergency bearer services or whether the UE considers itself attached for emergency bearer services.
  Detecting whether the UE is registered for emergency services or whether the UE considers itself registered for emergency services.

A limited service sub-state can include LIMITED-SERVICE.

In further examples, the UE 102 detects the UE is not emergency registered by at least one of:
  Detecting the UE is non-emergency attached with an EPC network;
  Detecting the UE is normally attached with an EPC network;
  Detecting the UE is attached but does not considers itself attached for emergency bearer services;
  Detecting the UE is attached but the UE is not attached for emergency bearer services;
  Detecting the UE considers itself normally attached with an EPC network;
  Detecting the UE is non-emergency registered with a 5G CN;
  Detecting the UE is normally registered with a 5G CN;
  Detecting the UE is registered but does not consider itself registered for emergency services;
  Detecting the UE is registered but the UE is not registered for emergency services.

In additional examples, the UE 102 can perform any or some combination of:
  The UE includes a derived URN using the information associated with the one of the one or more emergency numbers;
  The UE includes the derived URN in at least one of the one or more SIP request messages.

5. Details

5.0 General

Detailed changes are proposed below. Underlined, italic text indicates new text for current standards to realize part of the embodiments indicated in the subsection's title.

5.1 Details for Section 4.1.3

Modifications to the 3GPP TS 24.229 Specification are provided below, for implementing embodiments of section 4.1.3.

In first embodiments in section 4.1.0, the UE 102 including the "urn:service:sos" includes:
  Deriving a URN from the associated information from which the UE can derive a URN.
  Verifying if the URN matches first characteristics.
  If the URN matches first characteristics, including the "urn:service:sos".

The embodiments in this section clarified as follows, the first characteristics comprising "urn:service:sos", "urn:service:sos.ambulance", "urn:service:sos.police", "urn:service:sos.fire", "urn:service:sos.marine", "urn:service:sos.mountain"

A portion of modified 3GPP TS 24.229 is set forth below.

The Extended Local Emergency Number List (defined in 3GPP TS 24.301) can contain sub-services of the associated emergency service URN for the detected emergency number.

If:
  the length of sub-services field is greater than "0", the UE shall construct the emergency service URN using "urn:services:sos" followed by adding a dot followed by the content of the sub-services field; and
  the length of sub-services field is "0", the UE shall use the emergency service URN "urn:services:sos".
  If the network currently attached to is not the PLMN (or an equivalent PLMN of the PLMN) from which the Extended Local Emergency Number List was received, then the UE shall use the emergency service URN "um:services:sos", unless the constructed URN matches e.g. "um:service:sos.ambulance", "um:service:sos.police", "um:service:sos.fire", "um:service:sos.marine", or "um:service:sos.mountain".

5.2 Details for Section 4.2

A portion of modified 3GPP TS 24.229 for implementing embodiments of section 4.2 is set forth below.

If no Local Emergency Numbers List is contained in the ATTACH ACCEPT, REGISTER ACCEPT or in the TRACKING AREA UPDATE ACCEPT message, then the stored, first Local Emergency Numbers List in the user equipment shall be kept, except if the user equipment has successfully registered to a PLMN in a country different from that of the PLMN that sent the list. If no Extended Local Emergency Numbers List is contained in the ATTACH ACCEPT, REGISTER ACCEPT or in the TRACKING AREA UPDATE ACCEPT message, then the first Extended Local Emergency Numbers List or second Extended Local Emergency Numbers List in the user equipment shall be kept, with the following clarification, if:

the UE successfully registered to a PLMN different from that of the PLMN that sent the list or different from an equivalent PLMN of the PLMN that sent the list; or the UE is or considers itself:
  in limited service state;
  in a limited service sub-state;
  registered for emergency services; or
  attached for emergency bearer services;
to a PLMN different from that of the PLMN that sent the list or different from an equivalent PLMN of the PLMN that sent the list;

then create a second Extended Local Emergency Numbers List, and for each sub-services field in the first Extended Local Emergency Numbers List the UE shall, if:

the sub-services field matches e.g. "ambulance", "police", "fire", "marine", or "mountain", then the UE copies the entry with the digits and sub-services field into the second Extended Local Emergency Numbers List; or the sub-services field does not match e.g. "ambulance", "police", "fire", "marine", or "mountain", then the UE copies the digits into the second Extended Local Emergency Numbers List and sets the length of sub-services field, the length of the sub-services field associated with the digits, to zero; and the UE shall use the second Extended Local Emergency Numbers List.

Optionally, if:
the UE successfully registered to a PLMN equal to the PLMN that sent the list or equal to an equivalent PLMN of the PLMN that sent the list; or the UE is or considers itself:
  in limited service state;
  in a limited service sub-state;
  registered for emergency services; or
  attached for emergency bearer services;
to a PLMN equal to the PLMN that sent the list or equal to an equivalent PLMN of the PLMN that sent the list;

the UE shall use the first list.

5.3 Details for Section 4.3.3

A portion of modified 3GPP TS 24.229 is provided below to implement the following tasks of section 4.3.3:

The UE receiving the one or more emergency numbers and associated information in an Extended Emergency Number List (EENL) Information Element (IE), the EENL IE including at least one emergency number and associated information from which the UE can derive a URN. The EENL IE further including at least one indication.

The UE detecting that a dialled number matches one of the one or more emergency numbers.

The UE detecting, prior to sending one or more SIP request messages, whether the UE is emergency registered.

If the UE detects the UE is emergency registered and based on the at least one indication, the UE refraining requesting a connection suitable for transmission of one of the one or more SIP request messages or the UE refraining from sending at least one of the one or more SIP request messages.

The portion of modified 3GPP TS 24.229 is provided below:

If the dialled number is equal to a local emergency number stored in the Extended Local Emergency Number List (as defined in 3GPP TS 24.301), then the UE shall recognize such a number as for an emergency call and perform the procedures in subclause L.2.2.6.1B to determine a URN.

NOTE 3: How the UE resolves clashes where an emergency number requires performing both the procedures in subclause L.2.2.6.1A and the procedures in subclause L.2.2.6.1B, is implementation dependent.

If the UE has performed the procedures (e.g. in subclause L.2.2.6.18 or in subclause U.2.2.6.18) to derive the URN or has derived the URN and prior to:

sending the INVITE (see subclause 5.1.6) with the URN;

attempting an emergency call (see subclause 5.1.6); or performing an initial emergency registration (see subclause 5.1.6);

the UE determines that:
  the UE
    is in limited service state;
    is in a limited service substate;
    is attached for emergency bearer services;
    considers itself attached for emergency bearer services;
    is registered for emergency services; or
    considers itself registered for emergency services; and
  an indicator or indication or bit associated with the local emergency number indicates that the local emergency number cannot be used to request emergency services when the UE is in limited service state or when the UE is in a limited service substate or when the UE is either attached for emergency bearer services or registered for emergency services or the UE considers itself registered or attached as such;

then the UE aborts the emergency call setup procedure or the emergency session setup procedure. Optionally the UE does not:

send the INVITE with the URN;
attempt the emergency call; or
perform the initial emergency registration (see subclause 5.1.6);

Various tasks discussed herein can be performed by a hardware processing circuit or a combination of a hardware processing circuit and machine-readable instructions executable on the hardware processing circuit. The hardware processing circuit can be part of a device such as a UE, a network node, and so forth. A hardware processing circuit can include a processor, such as any or some combination of a microprocessor, a core of a multi-core microprocessor, a microcontroller, a programmable integrated circuit, a programmable gate array, or another hardware processing circuit.

Machine-readable instructions executable on a processor can refer to the instructions executable on a single processor or the instructions executable on multiple processors.

A processor performing a task can refer to a single processor performing the task or multiple processors performing the task.

Machine-readable instructions can be stored in non-transitory machine-readable or computer-readable storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of a user equipment (UE), comprising:
    detecting, at the UE, that a calling identifier, received as part of initiating a call by the UE, matches a first emergency identifier, the first emergency identifier associated with information related to a Uniform Resource Name (URN);
    detecting, at the UE, that the UE is in a second network different from a first network, wherein the first emergency identifier is configured by the first network; and
    in response to the detecting that the UE is in the second network different from the first network, including, by the UE, a particular URN, urn:service:sos, in a Session Initiation Protocol (SIP) INVITE message to be transmitted by the UE.

2. The method of claim 1, wherein the second network is used to request an emergency service identified by the first emergency identifier.

3. The method of claim 1, further comprising receiving, by the UE, the first emergency identifier from the first network.

4. The method of claim 1, wherein the first emergency identifier associated with the information related to the URN is included within a first Extended Emergency Number List (EENL) Information Element (IE).

5. The method of claim 4, wherein the first EENL IE is received from a network node that is part of the first network.

6. The method of claim 4, wherein the first EENL IE is provisioned via receipt of at least one of a TRACKING AREA UPDATE ACCEPT message, an ATTACH ACCEPT message, or a REGISTRATION ACCEPT message.

7. The method of claim 1, wherein the second network does not provision a second emergency identifier associated with the information related to the URN.

8. The method of claim 1, wherein the second network is a second Public Land Mobile Network (PLMN), and the first network is a first PLMN.

9. The method of claim 8, wherein detecting that the UE is in the second PLMN different from the first PLMN is based on one or more of:
    comparing a PLMN code of the second PLMN with a PLMN code of the first PLMN, or
    determining that the second PLMN is not an equivalent PLMN of the first PLMN.

10. The method of claim 1, further comprising receiving, by the UE, the information related to the URN.

11. The method of claim 10, wherein the information related to the URN includes the URN.

12. The method of claim 1, wherein the first emergency identifier and the information related to the URN is one or more of:
    received in an Extended Emergency Number List (EENL) Information Element, or
    received from a memory, a Universal Integrated Circuit Card (UICC), an application on a UICC, a Universal Subscriber Identity Module (USIM), and an Internet Protocol (IP) Multimedia System Identity Module (ISIM).

13. The method of claim 1, wherein the detecting that the UE is in the second network different from the first network is based on detecting that the second network is unknown.

14. The method of claim 1, further comprising:
    determining, by the UE, whether the UE is emergency registered with a network; and
    transmitting the SIP INVITE message including the particular URN, urn:service:sos, in response to the determining.

15. A user equipment (UE) comprising:
    a hardware processor configured to:
        detect that a calling identifier, received as part of initiating a call by the UE, matches a first emergency identifier, the first emergency identifier associated with information related to a Uniform Resource Name (URN);
        detect that the UE is in a second network different from a first network, wherein the first emergency identifier is configured by the first network; and
        in response to the detecting that the UE is in the second network different from the first network, include a particular URN, urn:service:sos, in a Session Initiation Protocol (SIP) INVITE message to be transmitted by the UE.

16. The UE of claim 15, wherein the first emergency identifier associated with the information related to the URN is included within a first Extended Emergency Number List (EENL) Information Element (IE).

17. The UE of claim 16, wherein the first EENL IE is received from a network node that is part of the first network.

18. The UE of claim 16, wherein the first EENL IE is provisioned via receipt of at least one of a TRACKING AREA UPDATE ACCEPT message, an ATTACH ACCEPT message, or a REGISTRATION ACCEPT message.

19. The UE of claim 15, wherein the second network does not provision a second emergency identifier associated with information related to the URN.

20. A non-transitory machine-readable medium comprising instructions that upon execution cause a user equipment (UE) to:
- detect that a calling identifier, received as part of initiating a call by the UE, matches a first emergency identifier, the first emergency identifier associated with information related to a Uniform Resource Name (URN);
- detect that the UE is in a second network different from a first network, wherein the first emergency identifier is configured by the first network; and
- in response to the detecting that the UE is in the second network different from the first network, include a particular URN, urn:service:sos, in a Session Initiation Protocol (SIP) INVITE message to be transmitted by the UE.

* * * * *